United States Patent [19]

Mizuno et al.

[11] 4,165,307

[45] Aug. 21, 1979

[54] PROCESS FOR PREPARATION OF MOLDING RESINS

[75] Inventors: Shioji Mizuno, Osaka; Toshinori Sugie, Takaishi, both of Japan

[73] Assignee: Dai Nippon Ink & Chemicals Incorporated, Japan

[21] Appl. No.: 786,217

[22] Filed: Apr. 11, 1977

[51] Int. Cl.² ............................ C08K 3/34; C08K 3/40
[52] U.S. Cl. ............................... 260/40 TN; 264/140; 525/440; 525/410; 525/411; 525/445; 525/466; 525/467
[58] Field of Search .................. 260/40 TN, 858; 264/140

[56] References Cited

U.S. PATENT DOCUMENTS

| | | | |
|---|---|---|---|
| 2,751,363 | 6/1956 | Martin | 260/40 TN X |
| 2,943,072 | 6/1960 | Forsythe | 260/40 TN |
| 4,009,043 | 2/1977 | Preis | 260/37 N X |
| 4,034,016 | 7/1977 | Baron et al. | 260/858 |
| 4,062,825 | 12/1977 | Watabe et al. | 260/40 TN |

FOREIGN PATENT DOCUMENTS

| | | | |
|---|---|---|---|
| 1769147 | 2/1972 | Fed. Rep. of Germany | 264/140 |

*Primary Examiner*—Sandra M. Person
*Attorney, Agent, or Firm*—Jacobs & Jacobs

[57] ABSTRACT

The present invention relates to a process for preparation of molding resins comprising heating and kneading an isocyanate prepolymer derived from a hydroxyl-terminated polymer and a polyfunctional isocyanate with a hydroxyl-terminated low-molecular-weight polybutylene terephthalate in the presence of reinforcing filler by means of an extruder.

12 Claims, No Drawings

PROCESS FOR PREPARATION OF MOLDING RESINS

BACKGROUND OF THE INVENTION

1. Field of the Invention

The present invention relates to a process for preparation of molding resins. More particularly, the invention relates to a process for preparation of molding resins comprising chain-extending polybutylene terephthalate (hereinafter referred to as "PBT") with an isocyanate prepolymer in the presence of a reinforcing filler. In order to prepare the molding resin according to the present invention, it is preferred that PBT be kneaded and reacted with an isocyanate prepolymer in the presence of a reinforcing agent in an extruder to accomplish formation of molding pellets simultaneously with the chain-extending reaction.

2. Description of the Prior Art

It is known that PBT has many excellent properties and is especially excellent in moldability and that PBT has a very high industrial value. However, when PBT is used as an industrial material, physical and chemical properties required in the final uses are not completely sufficient and therefore, PBT must be modified when it is practically used as an industrial material.

It is considered that the following three methods may be adopted for modification of PBT:

(1) Mechanical blending of PBT with other polymer or additive.
(2) Copolymerization or copolycondensation.
(3) Block copolymerization.

In the mechanical blending method (1), there is included a problem concerning the compatibility of the polymer or additive with PBT, and mechanical and other properties are often degraded drastically by incorporation of other polymer or additive. Further, the copolymerization or copolycondensation method (2) is defective in that the component to be copolymerized or copolycondensed is limited to specific glycols and diamines and undesirable results such as reduction of the crystallinity and moldability of PBT are often brought about by disturbance of the polymer chain arrangement caused by the copolymerized or copolycondensed component. The block copolymerization method (3) does not cause drastic reduction of mechanical properties or reduction of the crystallinity and moldability inherent of PBT, and it is deemed that this method will be effective. However, no satisfactory technical means for performing this block copolymerization has been developed or proposed.

Furthermore, in preparing polyesters such as PBT according to the melt polycondensation method, if it is intended to obtain a product having a high molecular weight, since the melt viscosity of the polymer is extremely increased, a special apparatus must be used for a highly viscous resin and a high vacuum must be maintained in the reaction system at the final stage of the polycondensation process. Thus, many technical problems are left unsolved.

As means for solving the foregoing problems, we already proposed a process for preparing molding resins by chain-extending low-molecular-weight PBT having hydroxyl groups on both the chain ends with a diisocyanate in the presence of a reinforcer (see Japanese Patent Application Public Disclosure No. 99741/1974). In this method, since the reaction between low-molecular-weight PBT and diisocyanate is not uniformly advanced, a homogeneous reaction product cannot be obtained. More specifically, in addition to the intended reaction between the diisocyanate and low-molecular-weight PBT, there are caused such side reaction as the mutual reaction between diisocyanate molecules and the reaction of the diisocyanate with the resulting urethane group, and it has been confirmed that the obtained product is inferior in heat resistance.

SUMMARY OF THE INVENTION

We devoted ourselves to research directed to eliminating the foregoing defects involved in our previously proposed method, and found that when low-molecular-weight PBT having hydroxyl groups on both the chain ends is reacted and chain-extended with an isocyanate prepolymer in the presence of a reinforcer by kneading in an extruder, the foregoing defects can be moderated or eliminated. According to the present invention, when an isocyanate prepolymer, especially a terephthalic acid type polyester isocyanate prepolymer is used, the foregoing defects are moderated or eliminated because the prepolymer has high melting point and the reaction is advanced uniformly. As a result, a resinous product excellent in heat resistance and mechanical strength can be obtained.

Therefore, an object of the present invention is to provide a process for preparing molding resins excellent in various properties such as heat resistance, mechanical strength and coating properties by chain-extending low-molecular-weight PBT having hydroxyl groups on both the chain ends with an isocyanate prepolymer in the presence of a reinforcing filler.

Another object of the present invention is to provide a process for the preparation of molding resins comprising chain-extending low-molecular-weight PBT having hydroxyl groups on both the chain ends with an isocyanate prepolymer in the presence of a reinforcing filler, wherein an isocyanate prepolymer derived from various kinds of hydroxyl-terminated polymer and a polyfunctional isocyanate is employed and a resin product having properties meeting requirements in final uses can be conveniently obtained by changing the kind of the hydroxyl-terminated polymer used.

Still another object of the present invention is to provide a process in which a molding resin excellent in physical properties and other properties is obtained by advancing the reaction between low-molecular-weight PBT having hydroxyl groups on both the chain ends and an isocyanate prepolymer without undesirable side reactions.

Other objects and advantages of the present invention will be apparent from the detailed descriptions given hereinafter.

DETAILED DESCRIPTION OF THE PREFERRED EMBODIMENTS

In the present invention, a linear hydroxyl-terminated polymer is preferably used for the synthesis of an isocyanate prepolymer to be used for the chain-extending reaction. For example, there can be mentioned linear polyethers, linear polyesters, linear polyester amides, linear hydroxyl-terminated liquid polybutadienes and linear polycarbonates, and mixtures thereof. Such polymer must have at least one terminal hydroxyl group and be capable of reacting with a polyfunctional isocyanate. The number average molecular weight of such hydroxyl-terminated polymer is not particularly critical, but, in general, it is preferred that the number average molecular weight of the polymer be in the range of from 100 to 10,000, preferably 200 to 5,000. It is preferable that at least 4/5 of the terminal groups of the polymer be occupied by hydroxyl groups and the number of hydroxyl groups in one molecule of the polymer be in the range of from 1.6 to 2.0. As examples of the polyether that can be used as such hydroxyl-terminated polymer, there can be illustrated homopolymers and copolymers of 1,2-alkylene oxides such as ethylene oxide, epichlorohydrin, 1,2-propylene oxide, 1,2-butylene oxide, 2,3-butylene oxide, and other oxides such as oxacyclobutane and substituted oxacyclobutanes and cyclocyclic ethers such as tetrahydrofuran. These polyethers are linear polyether glycols synthesized by, for example, polymerizing an alkylene oxide in the presence of glycohol or primary monoamine using a basic catalyst such as potassium hydroxide.

Polyesters and polyester amides may be synthesized, for example, from a dicarboxylic acid and a polyhydric alcohol and, if necessary, a small amount of a diamine or aminoalcohol. As the dicarboxylic acid preferably used, there can be mentioned a aliphatic dicarboxylic acids such as succinic acid, glutaric acid, adipic acid, suberic acid, azelaic acid and sebacic acid, aromatic dicarboxylic acids such as phthalic acid, isophthalic acid and terephthalic acid, lower alkyl esters thereof, and mixtures thereof. As the polyhydric alcohol, there can be mentioned glycols such as ethylene glycol, 1,2-propylene glycol, 1,3-butylene glycol, 2,3-butylene glycol, diethylene glycol, tetramethylene glycol, pentamethylene glycol, hexamethylene glycol, decamethylene glycol and 2,2-dimethyltrimethylene glycol. As the diamine and aminoalcohol, there can be mentioned, for example, ethylene diamine, hexamethylene diamine, monoethanol amine, phenylene diamine and benzidine. As other types of polyesters, polyesters synthesized from a lactone such as ε-caprolactone or dimethyl-ε-caprolactone or γ-butyllactone as main component or comonomer component may also be used.

The polycarbonate that may be used in the present invention is, in general, a condensate of a bisphenol and phosgen. As the bisphenol, there can be mentioned bisphenol A, bisphenol S, tetrabromobisphenol A, tetrachlorobisphenol A and mixtures thereof.

The polyfunctional isocyanate used in the present invention is preferably a diisocyanate expressed by the following chemical formula:

OCN—R—NCO wherein R stands for a divalent hydrocarbon rest having 2 to 15 carbon atoms. As such diisocyanate, there can be mentioned aliphatic and aromatic diisocyanates such as trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, propane diisocyanate-1,2, butane diisocyanate-1,2, pentane diisocyanate-1,2, pentane diisocyanate-1,3, hexane diisocyanate-1,4, hexane diisocyanate-1,5, 4-methylhexane diisocyanate-1,2, 3-methylhexane diisocyanate-1,4, 2-benzylpropane diisocyanate-1,3, 2,4-diphenylhexane diisocyanate-1,6, p-phenylene diisocyanate, n-phenylene diisocyanate, 4,4'-diphenyl diisocyanate, 1,4-naphthylene diisocyanate, 1,5-naphthylene diisocyanate, 1,8-naphthylene diisocyanate, 2,6-naphthylene diisocyanate, toluylene-2,4-diisocyanate, toluylene-2,6-diisocyanate, xylylene diisocyanate-1,3, xylylene diisocyanate-1,4, 4,4'-diisocyanate diphenyl ether, 2,2'-diisocyanate diethyl ether, 2,2'-diisocyanate diethyl sulfide, diphenylmethane-4,4'-diisocyanate and hydrogenated diphenylmethane-4,4'-diisocyanate. Further, polyfunctional isocyanates such as toluylene-2,4-diisocyanate dimer and toluylene-2,6-diisocyanate dimer can similarly be used. Still in addition, polyisocyanates containing at least three isocyanate groups in a molecule, such as triphenylmethane-4,4',4"-tri-isocyanate and crude 4,4'-diisocyanate diphenylmethane, can be used in combination with the foregoing diisocyanates or polyfunctional isocyanate, but it is preferred that such polyisocyanate be used in an amount of up to 10% by weight based on the diisocianate or polyfunctional isocyanate.

The isocyanate prepolymer used in the present invention is one obtained from adding excess amounts of the above-mentioned polyfunctional isocyanate to the above-mentioned hydroxyl-terminated polymer. The amount of the polyfunctional isocyanate to be used for the synthesis of this isocyanate prepolymer is calculated from the following formula:

Amount of polyfunctional isocyanate
(parts by weight)

$$= a \times \frac{M}{F} \times \frac{\beta}{m} \times X$$

wherein M stands for the molecular weight of the polyfunctional isocyanate, F stands for the number of isocyanate groups in one molecule of the polyfunctional isocyanate, β stands for the number of hydroxyl groups in one molecule of the hydroxyl-terminated polymer, which is in the range of from 1.6 to 2, m stands for the molecular weight of the hydroxyl-terminated polymer, X stands for the amount (parts by weight) of the hydroxyl-terminated polymer, and α stands for the ratio of the total number of isocyanate groups to the total number of hydroxyl groups, which is in the range of 1.05 to 4.0, preferably 1.3 to 3.0.

Preparation of the isocyanate prepolymer is ordinarily accomplished in a short time at a temperature of 30° to 250° C. under an inert gas atmosphere in an anhydrous state. The reaction may be carried out in an inert solvent such as toluene, dimethyl formamide, methylethyl ketone or the like according to need. For the preparation of the isocyanate prepolymer, an ordinary reaction vessel can be used, but in general, a single or twin extruder, a co-kneader or the like is preferably used. Preparation conditions may be appropriately chosen depending on the kinds of the used polymer and polyfunctional isocyanate.

Low-molecular-weight PBT used for the reaction with the isocyanate prepolymer may be one having a very low melt viscosity (corresponding to an inherent viscosity of 0.15 to 0.55 dl/g). Therefore, in the synthesis of PBT, there is no need for a special reaction vessel for a highly viscous resin or a high vacuum reaction vessel. More specifically, PBT that is used in the present invention can be conveniently prepared by a low-vacuum reaction vessel equipped with a very simple agitator. For example, the low-molecular-weight PBT can easily be prepared simply according to known means by performing ester-exchange between dimethyl terephthalate and 1,4-butane diol at a molar ratio defined in the formula hereinbefore at 130° to 260° C. in the presence of a catalyst such as titanate and then conducting polycondensation. The so prepared low-molecular-weight PBT preferably has hardly any terminal carboxyl group but has mainly hydroxyl groups alone as the terminal groups. In general, it is preferred that the low-molecular-weight PBT be characterized by a hydroxyl value (the amount (mg) of potassium hydroxide equivalent to hydroxyl groups contained in 1 g of the polymer) of 5 to 40, preferably 7 to 25 and an acid value (the amount (mg) of potassium hydroxide equivalent to carboxyl groups contained in 1 g of the polymer) of up to 10 and that the acid value be smaller than $\frac{1}{3}$ of the hydroxyl value. Such PBT does not have sufficient mechanical strength to be used directly as a polyester in the ordinary meaning. It should be noted that, in general, PBT having high molecular weight and sufficient strength for practical use has an inherent viscosity $[\eta]$ (as measured at 25° C. in a solvent of o-chlorophenol; the same to apply hereinafter) of at least 0.65 dl/g, preferably at least 0.7 dl/g. On the other hand, PBT used in the present invention has an inherent viscosity $[\eta]$ of 0.15 to 0.55 dl/g.

When the acid value of low-molecular-weight PBT is lower than 5, the melt viscosity of the polymer becomes too high at the preparation step and, therefore, a special reaction vessel for the high vacuum reaction must be employed. Moreover, reaction of such PBT with the isocyanate prepolymer is not advanced sufficiently and an intended resinous product having a high molecular weight can hardly be obtained. When the hydroxyl value of low-molecular-weight PBT is larger than 40, the amount of the isocyanate prepolymer to be reacted with PBT must be increased, and hence, a resinous product excellent in physical properties such as heat resistance and mechanical strength can hardly obtained.

In the present invention, the isocyanate prepolymer and low-molecular-weight PBT are used in such amounts that the ratio of the isocyanate group concentration to the hydroxyl group concentration is in a specific range, whereby a practical polymer having a high molecular weight can be provided. More specifically, the isocyanate prepolymer and low-molecular-weight PBT must be used in such amounts that the following requirement is satisfied:

$$(A)/(B) = (A')/(0.1-3.0) \times (B')$$

wherein (A) stands for the amount used of the low-molecular-weight PBT, (B) stands for the amount used of the isocyanate prepolymer, (A') stands for the hydroxyl equivalent weight (the molecular weight of the low-molecular-weight PBT per hydroxyl group) of the low-molecular-weight PBT, and (B') stands for the isocyanate equivalent weight (the molecular weight of the isocyanate prepolymer per isocyanate group) of the isocyanate prepolymer.

In general, the isocyanate prepolymer is used in the present invention by itself, but if desired, a small amount of the above-mentioned polyfunctional isocyanate may be added at the heating and kneading step so far as the above-mentioned requirement of the equivalent weight ratio is satisfied. More specifically, if the polyfunctional isocynate is used in combination with the isocyanate prepolymer, the amount of the polyfunctional isocyanate is calculated as a part of the amount of the isocyanate prepolymer used.

In the present invention, an ordinary extruder such as a single extruder, a twin extruder, a co-kneader or the like is used for the reaction between the low-molecular-weight PBT and isocyanate prepolymer, and no special extruder need be used at all. In general, the reaction is carried out at a temperature of 150° to 300° C., preferably 180° to 260° C., for 0.2 to 10 minutes.

According to the present invention, since various isocyanate prepolymers can be prepared as described hereinafter, properties of the hydroxylterminated polymer used for the synthesis of the isocyanate prepolymer are reflected in the properties of molding resin obtained and thus various kinds of molding resins can be easily prepared.

For example, if high softness is required, this can easily be attained by using an isocyanate prepolymer of a polyether or aliphatic polyester, and thus a variety of polymers having various softness can be obtained if the amounts and kinds of such isocyanate prepolymer used are altered. These polymers are advantageous over known polyurethane elastomers comprising polyether or aliphatic polyester linkages as soft segments and urethane and urea linkages as hard segments. In the present invention, a polymer excellent in the thermal stability can easily be prepared at a low cost by simple reaction in an extruder by using PBT linkages as crystalline high-melting-point hard segments and reducing the amount of the expensive isocyanate used.

Further, when it is desired to obtain a molding resin having a high softening point, this can easily be attained by using a polycarbonate as hydroxy terminated polymer. Further, if an isocyanate prepolymer of a halogen-containing polycarbonate is employed, a molding resin having a flame retardance and other desirable properties can be obtained. Furthermore, if it is desired to obtain a molding resin having high mechanical strength and high crystallinity, this can easily be attained by using an isocyanate prepolymer of a terephthalic acid type polyester.

According to the present invention, when the isocyanate prepolymer is mixed and reacted with the low-molecular-weight PBT in an extruder, the reaction is carried out in the presence of reinforcer. When the reinforcing filler is incorporated in the reaction mixture, various advantages are attained in the resulting molding resin. For example, the mechanical properties, heat resistance, dimension stability and mold shrinkage factor can be remarkably improved. As suitable examples of the reinforcing filler, there can be mentioned glass fibers treated with a known coupling agent, preferably a silane type coupling agent, for example chopped strand glass having a length of 1 to 30 mm or roving glass or asbestors fibers, cellulosic fibers, cotton fabric paper, synthetic fibers, metallic powders, calcium silicate, talc and clay. In general, the reinforcing filler is incorporated in an amount of 5 to 60% by weight, preferably 10 to 50% by weight, based on the resulting resin. Incidentally, the reinforcing filler may be incorporated into the extruder after the isocyanate prepolymer has been mixed and reacted with the low-molecular-weight PBT.

Various known additives may be incorporated into the molding resin prepared according to the present invention. For example, nulceating agents, pigments, dyes, plasticizers, flame retardants, release agents, adhesiveness improvers such as a bisphenol type epoxy resin and the like may be added to the molding resin of the present invention according to need.

The molding resin prepared according to the present invention is excellent in heat resistance and mechanical strength and it can be advantageously used in a field where such properties are required, especially as an engineering plastic. Of course, the molding resin can be conveniently and effectively applied to other ordinary uses. Since the molding resin of the present invention is obtained in the form of pellets by an extruder, it can be suitably used for extrusion molding or injection molding. Accordingly, it can be effectively used for production of automobile parts and electric applicances or in other fields where the above-mentioned properties are required. For example, the molding resin of the present invention is suitable for production of gears, relay, insulator, switch, connector, cam, case, housing, bobbin and the like. Further, since the molding resin of the present invention has a white to light yellow or to light yellowish brown color, it can be coloured in the desired color by using a coloring agent. When an aliphatic isocyanate prepolymer is employed as the isocyanate prepolymer, the resulting molding resin has a light white color, and when an aromatic isocyanate prepolymer is employed, the resulting molding resin is relatively colored but the mechanical strength is much higher than that of the molding resin prepared by using an aliphatic isocyanate prepolymer. Further, the degree of coloration may be controlled by adjusting the ratio of the amounts of PBT and the isocyanate prepolymer. By molding the molding resin of the present invention can be obtained a molded article having a good adhesion properties to air drying paint such as urethane paint or baking paint such as alkid-melamine print.

The present invention will now be described in detail with reference to the following Synthesis Examples and Examples, in which the isocynate equivalent value is expressed in terms of the amount (gram) of the compound containing 1 mole of an isocyanate group. The parts referred to in the following synthetic Examples and Examples mean "parts by weight".

Synthesis Example 1 (synthesis of low-molecular-weight PBT)

In 1260 parts by weight of 1,4-butane diol was dissolved 1940 parts by weight of dimethyl terephthalate at about 130° C., and 0.64 part by weight of tetraisopropyl titanate was added as the catalyst to the solution. With advance of the ester-exchange reaction and condensation, methanol formed as a by-product was distilled off. As the reaction proceeded, the temperature of the reaction mixture was gradually elevated and the mixture was finally heated to 240° C. When distillation of methanol had substantially ceased, the pressure was reduced to 60 mmHg while the temperature was maintained at 240° C. The reaction was continued in this state for 2 hours while removing excessive 1,4-butane diol from the reaction mixture. Then, the pressure was returned to atmospheric pressure and the resulting resin was taken off. The so formed resin was purely white low-molecular-weight PBT (A) having an acid value (the amounts (mg) of potassium hydroxide necessary for neutralizing 1 g of the polymer) of O and a hydroxyl value (the amounts (mg) of potassium hydroxide equivalent to hydroxyl groups contained in 1 g of the polymer) of 15. When the so formed resin was cooled, it underwent contraction while it was being crystallized. The product was brittle and self-disintegrating, and it was found to have a melting point of 225° C.

In the same manner as described as above, another brittle low-molecular-weight PBT (B) was prepared in a slightly long reaction time. The acid value and hydroxyl value of the so prepared PBT are shown in Table 1.

Table 1

| PBT | Acid Value | Hydroxyl Value | Inherent Viscosity (dl/g) | M.P. |
|-----|------------|----------------|---------------------------|------|
| A   | 0.0        | 15             | 0.37                      | 225° C. |
| B   | 2.5        | 11.1           | 0.43                      | 225° C. |

Synthesis Example 2 (synthesis of isocyanate prepolymer)

Isocyanate prepolymers (a to g) were synthesized by reacting hydroxyl-terminated polymers and diisocyanates shown in Table 2 in the absence of solvent. Synthesis conditions and obtained results are shown in Table 2.

Synthesis Example 3 (synthesis of isocynate prepolymer)

Under nitrogen current 5800 parts by weight of absolute methylethyl ketone was charged in a reaction vessel, and 1645 parts bby weight of diphenylmethane diisocyanate was added thereto and dissolved at 80° C. Then, 1000 parts by weight of bishydroxybutyl terephthalate (a bis-ester of terephthalic acid with 1,4-butane diol) was added to the solution and the mixture was agitated. Completely transparent solution was obtained when agitation was continued for about 15 minutes. When the solution was allowed to stand for about 30 minutes, precipitation of a white crystal started, and the reaction was continued in this state for 5 hours. The product was recovered by filtration, washed and dried to obtain an isocyanate prepolymer (h). Obtained results are shown in Table 2.

Synthesis Example 4 (synthesis of isocyanate prepolymer)

The synthesis of an isocyanate prepolymer was carried out in the same manner as described in Synthesis Example 3 except that 2000 parts by weight of diphenylmethane-4,4'-diisocyanate and 1000 parts by weight of dihydroxyethyl terephthalate (a bis-ester of terephthalic acid with ethylene glycol) were used as the starting compounds. The product was a white isocyanate prepolymer (i) having a melting point of 220° to 225° C. Obtained results are shown in Table 2.

Synthesis Example 5 (synthesis of isocyanate prepolymer)

In 10,000 parts by weight of dimethyl formamide, 1000 parts by weight of a polycarbonate having a molecular weight of 3535 which was synthesized from tetrabromobisphanol A and phosgene was reacted with 141 parts by weight of diphenylmethane-4,4'-diisocyanate at 100° C. for 10 hours. The reaction mixture was poured into a large quantity of petroleum ether, and the precipitate was recovered and washed to obtain an isocyanate prepolymer (j) having an isocyanate equivalent value of 2020. Obtained results are shown in Table 2.

Table 2

| Synthesis Example No. | Isocyanate Prepolymer | Hydroxyl-Terminated Polymer | | | Diisocyanate | |
|---|---|---|---|---|---|---|
| | | Kind | Molecular Weight | Amount (parts by weight) | Kind | Amount (parts by weight) |
| 2 | a | polyethylene glycol | 2000 | 1000 | MDI* | 250 |
| 2 | b | poly-ε-caprolactone | 2040 | 1000 | TDI** | 181 |
| 2 | c | " | 2040 | 1000 | MDI | 184 |
| 2 | d | polybutylene adipate | 1540 | 1000 | HDI*** | 218 |
| 2 | e | polyethylene adipate | 3020 | 1000 | TDI | 115 |
| 2 | f | " | 3020 | 1000 | MDI | 166 |
| 2 | g | polybutylene terephthalate | 820 | 1000 | MDI | 610 |
| 3 | h | bis-ester of terephthalic acid with 1,4-butane diol | 310 | 1000 | MDI | 1645 |
| 4 | i | bis-ester of terephthalic acid with ethylene glycol | 254 | 1000 | MDI | 2000 |
| 5 | j | polycarbonate | 3535 | 1000 | MDI | 141 |

| Synthesis Example No. | Isocyanate Hydroxyl Group Molar Ratio | Solvent | Reaction Conditions | | | Isocyanate Equivalent value of Product |
|---|---|---|---|---|---|---|
| | | | Atmosphere | Temperature (°C.) | Time (hrs) | |
| 2 | 2.00 | not used | $N_2$ | 80 | 11 | 1210 |
| 2 | 2.00 | not used | $N_2$ | 80 | 6 | 1150 |
| 2 | 1.50 | not used | $N_2$ | 80 | 8 | 2152 |
| 2 | 2.00 | not used | $N_2$ | 80 | 10 | 950 |
| 2 | 2.00 | not used | $N_2$ | 80 | 6 | 1710 |
| 2 | 2.00 | not used | $N_2$ | 80 | 10 | 1792 |
| 2 | 2.00 | not used | in co-kneader | 205 | 1/12 | 650 |
| 3 | 2.04 | methylethyl ketone | $N_2$ | 80 | 5 | 405 |
| 4 | 2.04 | " | $N_2$ | 80 | 5 | 405 |
| 5 | 2.00 | dimethylformamide | $N_2$ | 100 | 10 | 2020 |

Notes:
*diphenylmethane-4,4'-diisocyanate
**tolylene-2,4-diisocyanate
***hexamethylene diisocyanate

EXAMPLE 1

The low-molecular-weight PBT (A) prepared in Synthesis Example 1 was mixed with an isocyanate prepolymer shown in Table 2 and a chopped strand glass treated with a coupling agent of vinyltrichlorosilane and having a length of 6 mm, and the mixture was kneaded and extruded by a twin extruder to form pellets. A test piece was prepared from these pellets by injection molding, and properties of the test piece were determined. The amounts of the respective components, the extrusion conditions and the properties of the test piece are shown in Table 3.

In Table 3, the values of the tensile strength and tensile elongation are those determined according to ASTM D-638, and the values of the notched Izot impact strength are those determined according to ASTM D-256.

Table 3

| Pellet No. | Compounded Components | | | | Total Isocyanate (NCO/OH molar ratio) | Glass Fiber (parts by weight) |
|---|---|---|---|---|---|---|
| | Low-Molecular-Weight PBT | | Isocyanate Prepolymer | | | |
| | Kind | Amount(parts by weight) | Kind | Amount(parts by weight) | | |
| I | A | 100 | a | 42 | 1.3 | 60.9 |
| II | A | 100 | b | 40 | 1.3 | 15.6 |
| III | A | 100 | b | 40 | 1.3 | 60.0 |
| IV | A | 100 | b | 40 | 1.3 | 140.0 |
| V | A | 100 | c | 74.8 | 1.3 | 74.9 |
| VI | A | 100 | d | 27.9 | 1.1 | 54.8 |
| VII | A | 100 | e | 50.3 | 1.1 | 64.4 |
| VIII | A | 100 | f | 47.9 | 1.0 | 63.4 |
| IX | A | 100 | g | 17.3 | 1.0 | 50.3 |

| Pellet No. | Extrusion Temperature (°C.) | Inherent Viscosity (dl/g) of Pellets | Properties of Test Piece | | Notched Izot Impact Strength (kg·cm/cm) |
|---|---|---|---|---|---|
| | | | Tensile Test | | |
| | | | Strength (kg/cm$^2$) | Elongation (%) | |
| I | 220 | 0.88 | 850 | 10 | not broken |
| II | 220 | 0.77 | 900 | 19 | " |
| III | 220 | 0.75 | 1150 | 12 | " |
| IV | 220 | 0.77 | 1350 | 2 | " |
| V | 235 | 0.97 | 950 | 18 | " |
| VI | 220 | 0.79 | 900 | 7 | " |
| VII | 220 | 0.83 | 1000 | 8 | " |

Table 3-continued

| | | | | | |
|---|---|---|---|---|---|
| VIII | 240 | 0.98 | 1100 | 2.3 | 12 |
| IX | 240 | 1.05 | 1350 | 2 | 11 |

EXAMPLE 2

A homogeneous mixture of 100 parts by weight of the low-molecular-weight PBT (B) obtained in Synthesis Example 1, 18.7 parts by weight of the isocyanate prepolymer (c) obtained in Synthesis Example 2, 2.2 parts by weight of diphenylmethane diisocyanate and 52.5 parts by weight of a chopped glass fiber treated with vinylsilane and having a length of 6 mm was mixed and extruded at 210° C. by a vent-equipped full-flighted screw type single extruder to form pellets (No. X). A test piece was prepared from these pellets by injection molding, and properties of the test piece were determined. It was found that the tensile strength was 1250 Kg/cm² and the tensile elongation was 4.0%. The inherent viscosity of the pellets was 0.89 dl/g.

EXAMPLE 3

Pellets (Nos. XI and XII) were prepared from the isocyanate prepolymer (h) obtained in Synthesis Example 3 and the isocyanate prepolymer (i) obtained in Synthesis Example 4 in the same manner as described in Example 1. Compounding and extrusion conditions and properties of the resulting pellets are shown in Table 4.

For comparison, pellets were prepared by using diphenylmethane diisocyanate instead of the isocyanate prepolymer, and a test piece was prepared from these pellets. Obtained results are shown in Table 4.

In Table 4, the values of the flexual strength and flexural elasticity are those determined according to ASTM D-790. The thermal age resistance test was conducted in an oven at 150° C. for 500 hours and 1000 hours, and the tensile strength retention ratio was determined and the change of the color of the test piece by the heat treatment was examined. In Table 4, pellets Nos. XIII and XIV are comparative samples prepared as indicated in Example 3.

Table 4

| Pellet No. | Low-Molecular-Weight PBT Kind | Low-Molecular-Weight PBT Amount (parts by weight) | uz,6/42 Compounds Components Isocyanate PBT Kind | uz,6/42 Compounds Components Isocyanate PBT Amount (parts by weight) | Prepolymer cyanate (NCO/OH molar ratio | Total Iso (parts by weight) of Glass Fibers | Amount Extrusion Temperature (°C.) |
|---|---|---|---|---|---|---|---|
| XI | A | a 100 | h | 12 | 1.1 | 48 | 240 |
| XII | A | 100 | i | 11 | 1.1 | 48 | 240 |
| XIII | A | 100 | MDI-3.7 | | 1.1 | 44 | 240 |
| XIV | A | 100 | MDI-7.3 | | 2.2 | 46 | 240 |

| Pellet No. | Inherent Viscosity (dl/g) of Pellets | Properties of Test Piece Tensle Strength (kg/cm²) | Properties of Test Piece Flexural Strength (kg/cm²) | Properties of Test Piece Flexural Elasticity (kg/cm²) | Properties of Test Piece Notched Izot Impact Strength (kg. cm/cm) | Thermal Age Resistance Test (150° C.) Tensile Strength Retention Ratio (%) 500 hours | Thermal Age Resistance Test (150° C.) Tensile Strength Retention Ratio (%) 1000 hours | Color 500 hours | Color 1000 hours(kg |
|---|---|---|---|---|---|---|---|---|---|
| XI | 0.90 | 1350 | 1900 | $8.5 \times 10^4$ | 10 | 96 | 93 | slight yellow | yellow |
| XII | 0.92 | 1370 | 2000 | $8.5 \times 10^4$ | 10 | 96 | 92 | " | " |
| XIII | 0.75 | 1000 | 1400 | $7.0 \times 10^4$ | 6 | 95 | 90 | " | " |
| XIV | 0.90 | 1390 | 1980 | $8.6 \times 10^4$ | 11 | 70 | 50 | light brown | brown |

As will be apparent from the results shown in Table 4, the inherent viscosity of pellets No. XIII prepared by using MDI instead of the isocyanate prepolymer of the present invention was not as high as that of the pellets formed according to the present invention, and such comparative pellets provided merely a molded article inferior in tensile strength, flexural strength and notched Izot impact strength. In pellets No. XIV obtained by doubling the amount of MDI used in pellet No. XIII, since the molar ratio of the isocyanate groups to the hydroxyl groups was as high as 2.2, side reactions were caused between the urethane group and isocyanate group and mutually among the isocyanate groups, and a molded article formed from such pellets was much inferior to a molded article formed from the pellets according to the present invention with respect to the heat resistance, and thermal degradation of such comparative molded article was very conspicuous.

EXAMPLE 4

A homogeneous mixture of 100 parts by weight of the low-molecular-weight PBT (A) obtained in Synthesis Example 1, 27.0 parts by weight of the isocyanate prepolymer (j) obtained in Synthesis Example 5, 3.3 parts by weight of diphenylmethane diisocyanate, 6.35 parts by weight of antimony trioxide and 58.6 parts by weight of vinylsilane-treated chopped glass fibers having a length of 6 mm was extruded at 220° C. by a vent-equipped full-flighted screw type single extruder to obtain pellets (No. XV). A test piece was prepared from these pellets by injection molding, and properties of the test piece were determined. It was found that the tensile strength was 1300 kg/cm², the tensile elongation was 3.0%, the flexural strength was 1800 kg/cm², the notched Izot impact strength was 11 kg·cm/cm and the flame retardancy was V-O as measured according to the method UL94 in UL Laboratories (U.S.A.) Subject 94c.

What we claim is:

1. A process for the preparation of molding resins comprising heating and kneading an isocyanate prepolymer derived from a hydroxyl-terminated polymer and a polyfunctional isocyanate, with a hydroxyl-terminated low-molecular-weight polybutylene terephthalate having an inherent viscosity as herein defined of 0.15 to 0.55 dl/g in the presence of a reinforcing filler by means of an extruder, the amount of said isocyanate prepolymer and said low-molecular-weight polybutylene terephthalate being such as to satisfy the following relationship:

$$(A)/(B) = (A')/(0.1-3.0) \times (B')$$

wherein A is the amount of said low-molecular-weight polybutylene terephthalate, B is the amount of said isocyanate prepolymer, A' is the hydroxyl equivalent weight (the molecular weight of said low-molecular-weight polybutylene terephthalate per hydroxyl group) of said low molecular-weight-polybutylene terephthalate and B' is the isocyanate equivalent weight (the molecular weight of said isocyanate prepolymer per isocyanate group) of said isocyanate prepolymer.

2. A process for the preparation of molding resins according to claim 1 wherein the reinforcing filler is a glass fiber.

3. A process for the preparation of molding resins according to claim 1 wherein the reinforcing filler is an asbestos fiber.

4. A process for the preparation of molding resins according to claim 1 wherein the reinforcing filler is a synthetic fiber.

5. A process for the preparation of molding resins according to claim 1 wherein the hydroxyl-terminated polymer has a number average molecular weight of from 100 to 10,000.

6. A process for the preparation of molding resins according to claim 1 wherein the hydroxyl-terminated low-molecular-weight polybutylene terephthalate has a hydroxyl value of from 5 to 40.

7. A process for the preparation of molding resins according to claim 1 wherein the kneading by the extruder is carried out at a temperature of from 150° to 300° C., for from 0.2 to 10 minutes.

8. A process for the preparation of molding resins according to claim 1 wherein the resulting molding resin is obtained in the form of pellets molded by the extruder.

9. A molded article prepared from a molding resin formed according to the process set forth in claim 1.

10. A process for the preparation of molding resins according to claim 5, wherein the number average molecular weight is from 200 to 5,000.

11. A process for the preparation of molding resins according to claim 6, wherein the hydroxyl value is from 7 to 15.

12. A process for the preparation of molding resins according to claim 7, wherein the temperature is from 180° to 260° C.

* * * * *